US006585234B2

(12) United States Patent
Berto

(10) Patent No.: US 6,585,234 B2
(45) Date of Patent: Jul. 1, 2003

(54) FENCING SYSTEM

(76) Inventor: Joseph J. Berto, 10984 Meadows Rd., White City, OR (US) 97503

( * ) Notice: Subject to any disclaimer, the term of this patent is extended or adjusted under 35 U.S.C. 154(b) by 0 days.

(21) Appl. No.: 09/829,471

(22) Filed: Apr. 9, 2001

(65) Prior Publication Data

US 2001/0015427 A1 Aug. 23, 2001

Related U.S. Application Data

(62) Division of application No. 09/321,698, filed on May 28, 1999.
(60) Provisional application No. 60/109,678, filed on Nov. 24, 1998.

(51) Int. Cl.⁷ ............................................... E04H 17/14
(52) U.S. Cl. ................... 256/19; 256/65.01; 256/65.02; 256/66
(58) Field of Search ............................. 256/65, 59, 66, 256/68, 47, 50, 19, 10, 65.01, 65.02, 65.03, 65.04

(56) References Cited

U.S. PATENT DOCUMENTS

| | | | | |
|---|---|---|---|---|
| 1,864,159 A | * | 6/1932 | Williams ................... 256/65 X |
| 2,800,305 A | * | 7/1957 | Gerstner ...................... 256/65 |
| 3,820,758 A | | 6/1974 | Berg, Jr. et al. .............. 256/10 |
| 3,995,833 A | * | 12/1976 | McLaughlin et al. 256/65.04 X |
| 4,077,611 A | | 3/1978 | Wilson .......................... 256/10 |
| 4,508,320 A | * | 4/1985 | Hegarty ......................... 256/47 |
| 4,520,231 A | | 5/1985 | Hubbell ....................... 174/158 |
| 4,623,126 A | * | 11/1986 | Pettit ............................. 256/25 |
| 4,623,756 A | | 11/1986 | Wilson, Jr. .................. 174/158 |
| 4,680,428 A | | 7/1987 | Wilson, Jr. .................. 174/158 |
| 4,763,879 A | * | 8/1988 | Wasicek et al. ............... 256/36 |
| 4,792,122 A | | 12/1988 | Smrt ............................. 256/68 |
| 4,866,218 A | * | 9/1989 | Wilson, Jr. ................. 256/10 X |
| 4,973,029 A | * | 11/1990 | Robbins, III .............. 256/10 X |
| 5,085,409 A | | 2/1992 | Teixeira ........................ 256/48 |
| 5,238,321 A | * | 8/1993 | Jarjoura .................... 256/65 X |
| 5,439,201 A | * | 8/1995 | Landreville .............. 256/65.06 |
| 5,529,289 A | | 6/1996 | Lancer, Sr. ................... 256/66 |
| 5,556,079 A | | 9/1996 | West ............................ 256/22 |
| 5,702,090 A | | 12/1997 | Edgman ........................ 256/19 |
| 5,755,431 A | | 5/1998 | Williams ...................... 256/19 |
| 5,913,508 A | * | 6/1999 | Eades ........................... 256/65 |
| 5,938,184 A | | 8/1999 | DeSouza ...................... 256/19 |
| 5,992,828 A | | 11/1999 | Burdick ........................ 256/10 |
| 6,149,135 A | * | 11/2000 | Hlavin ......................... 256/24 |
| 6,283,457 B1 | * | 9/2001 | Venegas, Jr. ................. 256/19 |

OTHER PUBLICATIONS

Country Estate Fence—Rail Fence (No Date).

* cited by examiner

*Primary Examiner*—Lynne H. Browne
*Assistant Examiner*—John R. Cottingham
(74) *Attorney, Agent, or Firm*—Burns, Doane, Swecker & Mathis, L.L.P.

(57) ABSTRACT

A fence rail holder for connection to conventional metal fence posts having a generally T-shaped cross section is provided which allows PVC fence rails to be connected to metal fence posts. The fence rail holder detachably mounts on a fence post using at least one clip which attaches to the T-shaped fence post. Openings at opposite side surfaces of the fence rail holder receive and support the fence rails. The fencing system allows the addition of a very visible, white PVC or other rail to a conventional barbed wire or wire mesh fence. The fencing system also includes wire support members which allow electric wire or other wire to be easily connected to a PVC fence.

31 Claims, 7 Drawing Sheets

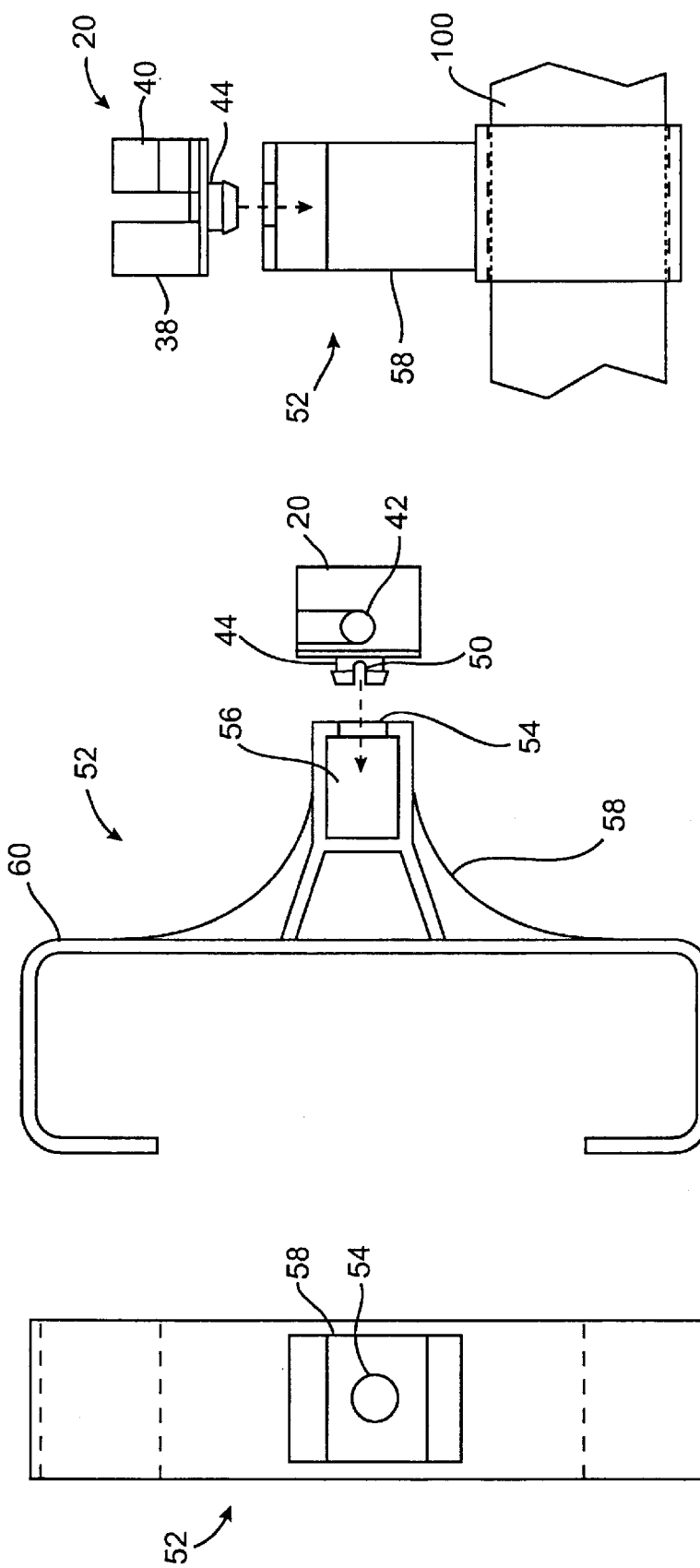

FENCING SYSTEM

This application is a divisional, of application Ser. No. 09/321,698, filed May 28, 1999, which claims priority to Prov. Appl. No. 60/109,678, filed on Nov. 24, 1998.

BACKGROUND OF THE INVENTION

1. Field of the Invention

The invention relates to a fencing system, and more particularly, the invention relates to a fence rail holder for connection to conventional metal fence posts.

2. Brief Description of the Related Art

There are many different fencing options for fencing horses and other animals such as wood, PVC, high-tensile wire, barbed wire, wire mesh, metal pipe, and others. Each of these fencing materials has different advantages and disadvantages in the areas of strength, visibility, aesthetics, and maintenance.

Wooden plank or post and rail fencing is both sturdy and attractive. Wood fencing is also quite visible to horses which discourages them from crashing into the fence. However, wood fencing requires high maintenance in painting and replacing rotten wooden fence posts and rails. Wooden fencing is also rather costly.

Wire fencing including barbed wire and wire mesh fencing is easy to install and uses a common inexpensive metal "T" post system for supporting the fencing. However, the metal T-posts of this type of fencing are narrow and the wire is thin making the fence very difficult for animals to see particularly in poor light.

PVC fencing has been used as an alternative to wooden fencing and provides the superior aesthetics of a conventional wooden fence without the associated maintenance. However, the new PVC fencing systems are relatively expensive. In addition, animals may lean or rub against the PVC fencing causing it to crack in cold weather.

Accordingly, it would be desirable to provide a fencing system having the visibility advantages of a wooden or PVC fence with the cost advantages of a wire mesh or barbed wire fence.

It would also be desirable to provide a system for easily mounting an electric wire on a PVC fence to prevent animals from leaning or rubbing on the fence.

SUMMARY OF THE INVENTION

The present invention relates to a fence rail holder for detachably mounting to conventional metal fence posts.

The invention also relates to a fencing system for attaching PVC fence rails to non-PVC fence posts.

The invention also relates to a system for attaching an electric wire to a PVC fence.

In accordance with one aspect of the present invention, a fence rail holder for mounting fence rails on a fence post includes a body having openings for receiving and supporting ends of fence rails, and at least one clip secured to the body, the clip being configured to connect the body to a fence post.

In accordance with another aspect of the present invention, a system includes a metal fence post with a PVC fence rail holder connected to the metal fence post by clips. The fence rail holder has openings on opposite sides of the fence rail holder and a plurality of fence rails are received in the openings.

In accordance with an additional aspect of the present invention, a wire support member made of an electrically insulating material includes a wire supporting portion for receiving and supporting an electric wire, and a stem connected to the wire supporting portion. The stem has at least two flexible fingers configured to snap into a corresponding opening in a PVC fence member to secure the wire support member to the PVC fence member.

The present invention provides the advantage of a fencing system having the visibility and easy installation advantages of a wooden or PVC fence with the cost advantages of a wire mesh or barbed fence.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 10 is a side view of an adaptor and the wire support member of FIGS. 7 and 8;

FIG. 11 is a front view of the adaptor of FIG. 10;

FIG. 12 is a top view of the adaptor and wire support member of FIG. 10;

DETAILED DESCRIPTION OF THE PREFERRED EMBODIMENTS

The fence rail holder 10 according to the present invention provides the visibility of a wooden or PVC fence at a lower cost because it enables a PVC fence rail to be connected to the inexpensive metal posts commonly used to install barbed wire and wire mesh fences. The fencing system of the present invention also provides a way to attach an electric fence or hot wire to PVC fencing.

As shown in FIGS. 1–4, the fence rail holder 10 includes a hollow body which defines rectangular openings 12 at opposite sides, configured to receive a commonly available fence rail 100. The fence rails 100 are easily visible and the cross-sectional area of each rail is in the range of about ½ by about 1 inch, to about 5 by about 8 inches. The fence rails may also be square in cross section. In one embodiment, the PVC fence rail is about 1½ by about 5½ inches.

Figure 2:
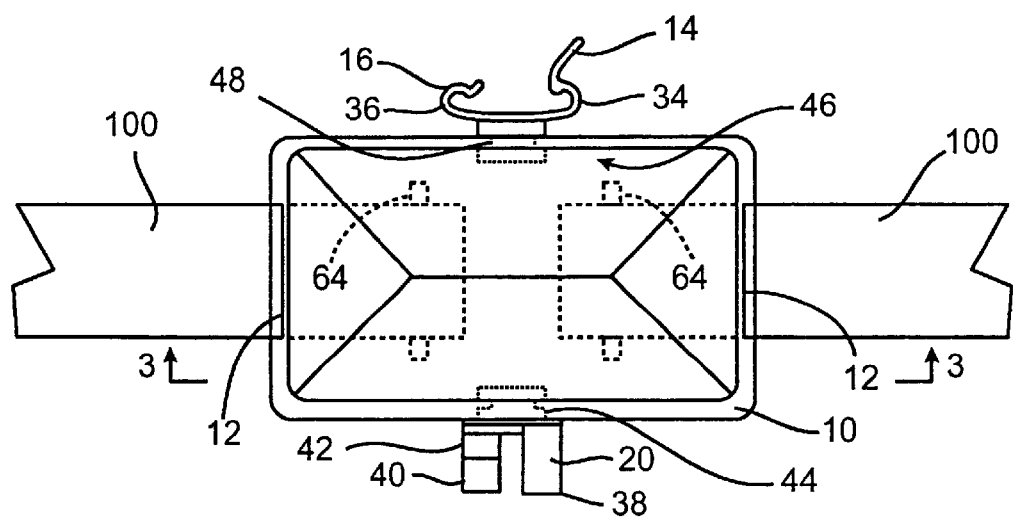
FIG. 2 is a top view of the fence rail holder and fence rails according to the present invention.
Figure 3:
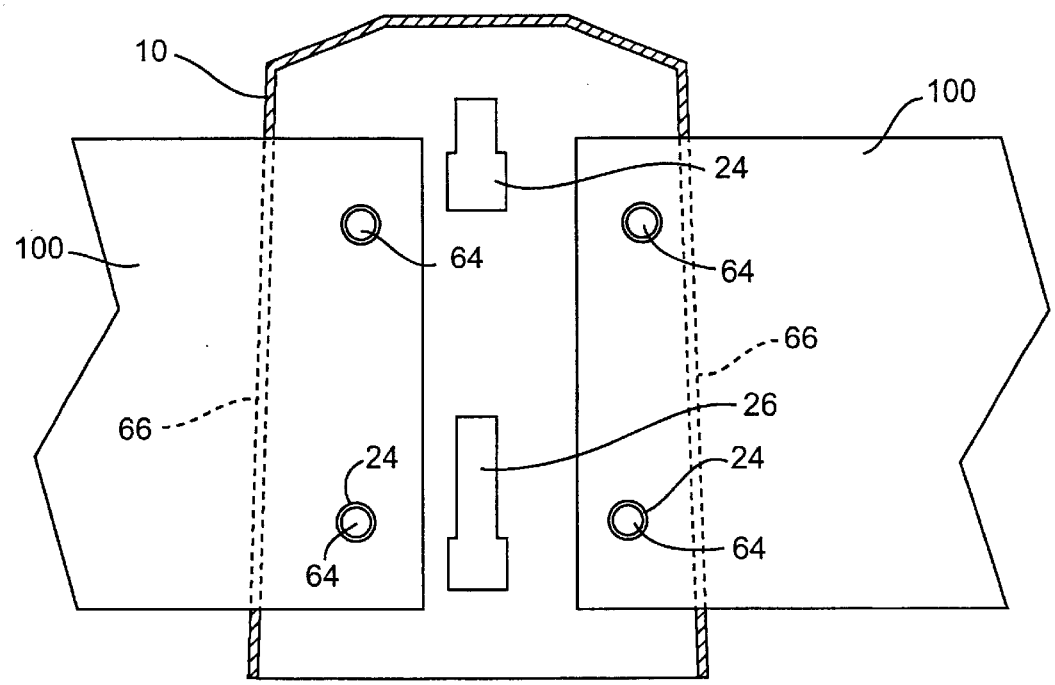
FIG. 3 is a cross-sectional view of the fence rail holder and fence rails of FIG. 2 taken along line 3—3 of FIG. 2.
Figure 4:
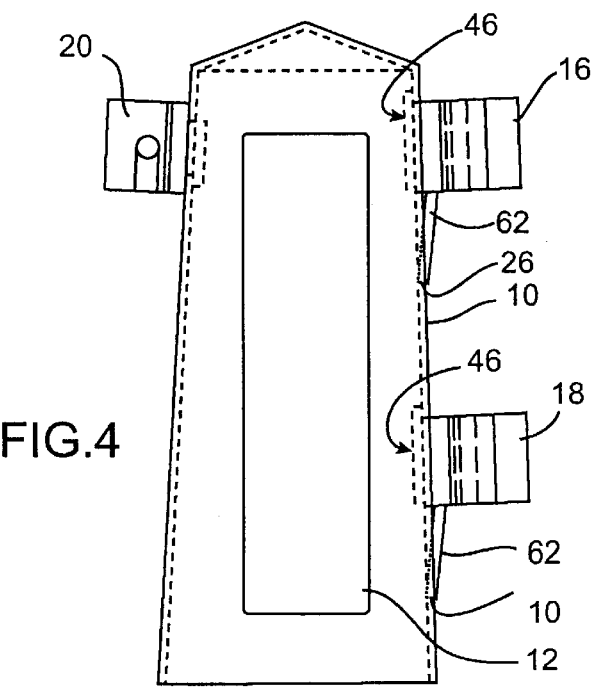
FIG. 4 is a side view of the fence rail holder.

Two clips 16, 18 including a fixed upper clip 16 and a slidable lower clip 18 are positioned on a rear surface of the fence rail holder 10, as shown in FIGS. 2–4. These clips 16, 18 have somewhat U-shaped portions which are substantially the same size and shape and are configured to be received on the conventional "T" shaped fence posts. The clips 16, 18 have a configuration which allows the fence rail holder 10 to be easily snapped onto the "T" posts and to be removed from the posts by pressing on the elongated lever end 14 of the clip. Attaching the fence rail holder 10 to a "T" post allows the addition of a very visible, white or other colored PVC, or other rail to a conventional barbed wire or wire mesh fence. The PVC rail may be placed along the top of the fence in place of or in addition to a top strand of barbed wire.

As illustrated in FIGS. 2 and 4, each clip has a mounting portion 46 which can be received in an opening 26 in the rear surface of the fence rail holder 10. In one embodiment, the mounting portion 46 has a groove 48 disposed about an edge of the mounting portion. When the clip 16, 18 is inserted in the fence rail holder 10, the groove 48 engages the side surfaces of the opening 26. The mounting portion 46 has an optional locking mechanism 62 which secures the clips 16, 18 in place when inserted in the fence rail holder 10. The locking mechanism 62 includes a tail which extends downward from the clips 16, 18 and snaps into the opening 26 and prevents clips from sliding out of the opening.

Figure 1:
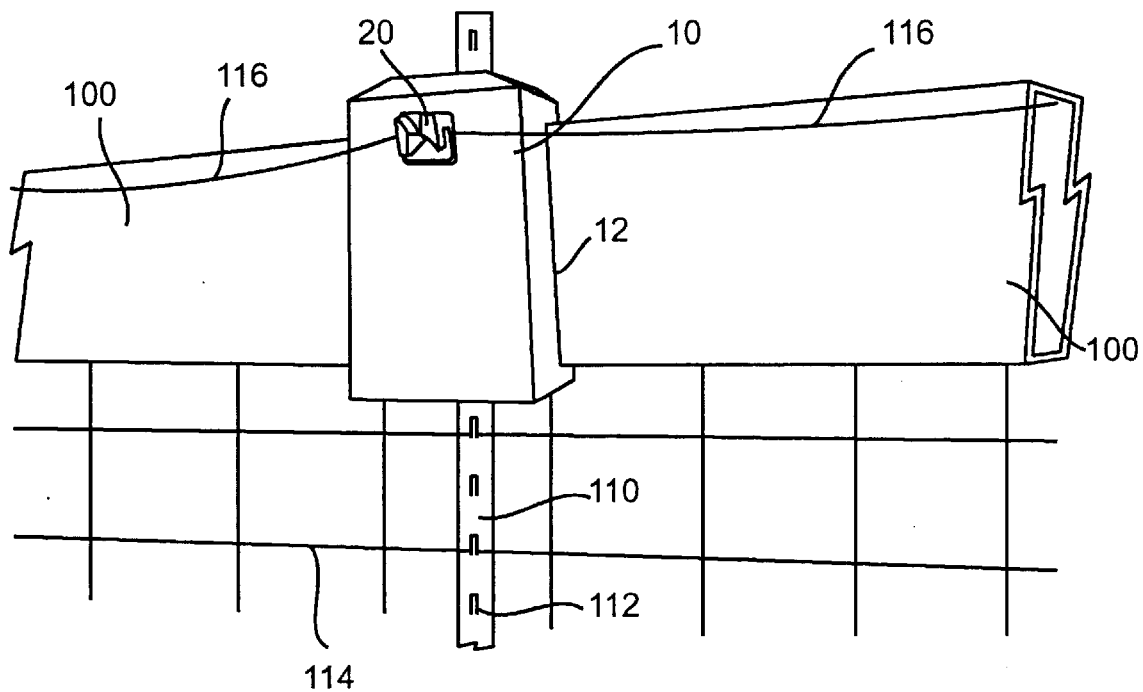
FIG. 1 is a perspective view of a fencing system according to the present invention.

The conventional metal "T" posts 110 have a plurality of protrusions 112, shown in FIG. 1, along a front face which prevent the wire 114 from slipping along the post. Since there is no industry standard for these metal fence posts 110, the spacing between the protrusions 112 varies widely between manufacturers. The slidable lower clip 18 which slides in the elongated lower opening 26 allows the fence rail holder 10 to be mounted on posts from different manufacturers. Generally, the upper clip 16 will be snapped onto the fence post between the top two protrusions 112 and the lower clip 18 will be adjusted by sliding the clip vertically in the lower opening 26 in the fence rail holder 10 so that the lower clip can be received on the fence post without obstruction from the protrusions.

The fence rail holder 10 is preferably constructed of plastic, such as PVC, and includes a wire support member 20 on a front surface which allows the mounting of an electric wire 116, barbed wire, electric tape, electric rope, or other wire along a front face of the fence rails 100. The wire support member 20 is fabricated from an electrically insulating material and may be integral with or separate from the fence rail holder 10. Examples of wire support members will be described in further detail below with respect to FIGS. 5–9.

The fence rails 100 are inserted into the openings 12 on either side of the fence rail holder 10 and may be held in place by tangs on the rail or by other fasteners. For example, the fence rail holder 10 may be provided with a plurality of holes 24 in the front or rear surface. After the fence rails are inserted into the openings 12 in the sides of the fence rail holder 10, a hole may be drilled in the fence rail through the holes 24 in the fence rail holder 10 and a pin 64 or tab is inserted into the hole. The fence rail 100 is prevented from being removed from the fence rail holder 10 by the ends of the pin 64. This provides an easy attachment system for attaching the fence rails 100 to the fence rail holder 10 in a removable manner which prevents the fence rails from falling out of the fence rail holder if the posts shift. The attachment system also allows some amount of give between the fence rail holder 10 and the rails 100.

FIGS. 5–9 illustrate two embodiments of wire support members 20A, 20B having two different connections for connecting to a PVC fence post, rail, or to the fence rail holder 10.

Figure 5:
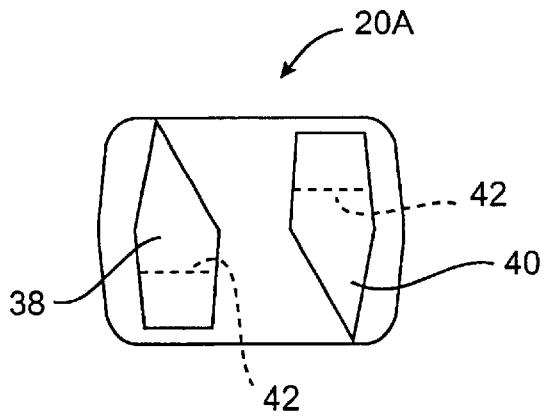
FIG. 5 is a front view of one embodiment of a wire support member.
Figure 6:
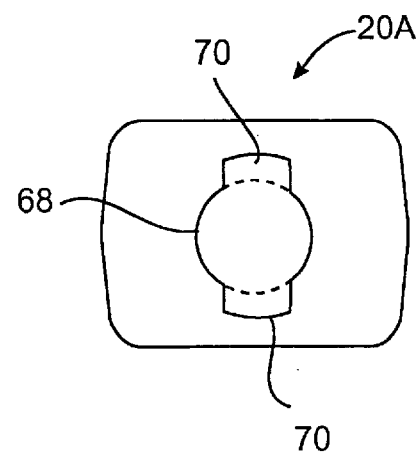
FIG. 6 is a rear view of the wire support member of FIG. 5.

FIGS. 5 and 6 illustrate one example of a wire support member 20A having two fingers 38, 40 for receiving and supporting a hot wire or other wire. The fingers 38, 40 are generally U-shaped and have a wire receiving slot 42. One slot 42 of one of the fingers 38 opens upward and the other slot of the other finger 40 opens downward so that one finger 38 limits vertical upward movement of a wire (not shown) resting in the slot 42 while the other finger 40 limits vertical downward movement of the wire.

FIG. 6 illustrates a rear view of the first embodiment of the wire support member 20A. According to this embodiment, the wire support member 20A is provided with a circular protruding shaft 68 having two tabs 70 or key members which extend from the shaft for locking the member into place. In use, an opening is formed in the fence rail holder 10 or other fencing member which is configured to receive the shaft 68 and the tabs 70. The wire support member 20A is inserted into the opening and rotated 90 degrees to lock the member in place.

Figure 7:
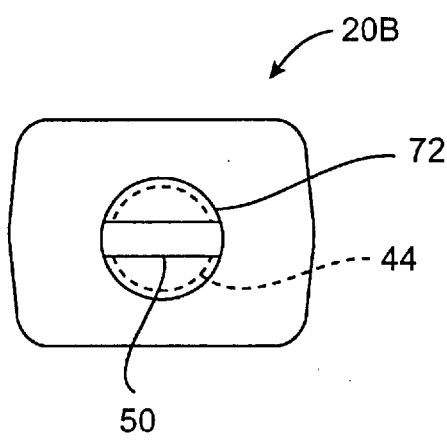
FIG. 7 is a rear view of an alternative embodiment of a wire support member.
Figure 8:
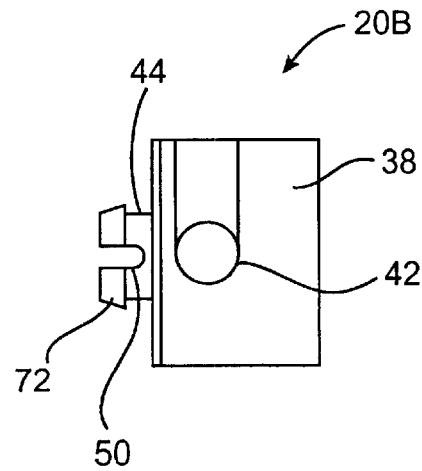
FIG. 8 is a side view of the wire support member of FIG. 7.
Figure 9:
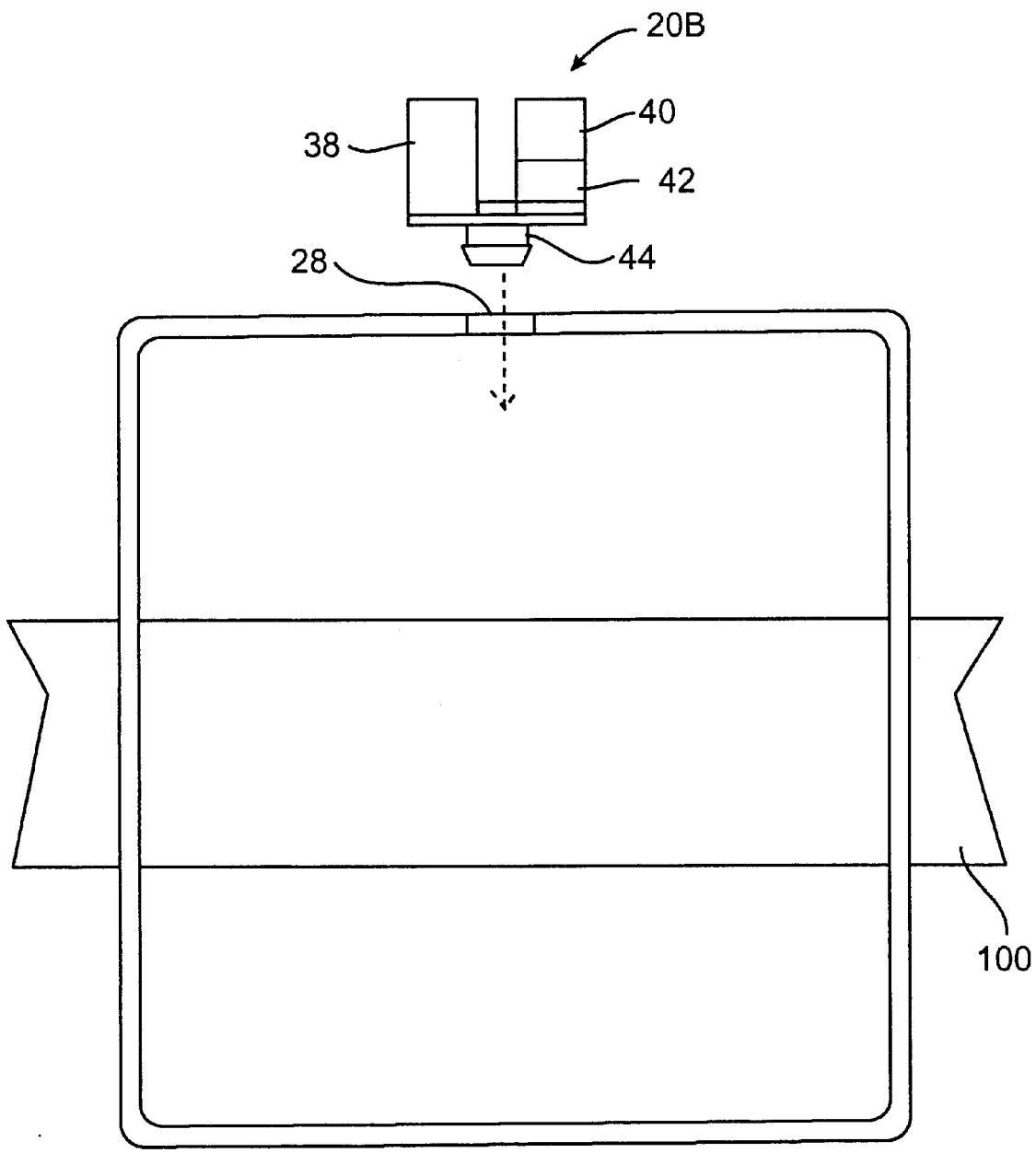
FIG. 9 is a top view of a PVC fence post, fence rail, and the wire support member of FIGS. 7 and 8.

An alternative embodiment of a wire support member 20B, as shown in FIGS. 7–9, has a snap fit connection for quick mounting the member into a fencing system. The snap fit connection includes a stem 44 having a tapered or conical shaped rim 72. The stem 44 mounts the wire support member 20 on the fence rail holder 10. As shown in FIG. 8, the stem 44 is provided with at least one longitudinal slot 50 which the slot allows the stem 44 to be compressed to a smaller diameter to snap into an opening in a fencing member. The opening in the fencing member has a smaller diameter than the rim 72 such that when the stem 44 is inserted in the opening, the stem and rim compress to create a close fit between the fencing member and stem. FIG. 9 is a top view of a conventional PVC post 120 and PVC rail 100 system having a circular opening 28 drilled in the post for attaching the wire support member 20B in a snap fit arrangement.

In an alternative embodiment, the stem 44 comprises a plurality of spring-contact fingers which form a hollow body. When inserting the stem 44 in the opening, the spring-contact fingers deflect and allow the stem to pass through the opening. Examples of the attachment means for attaching the wire support member 20 to a fence member have been described. Other examples of attachment means include but are not limited to clamping, snap fitting mechanisms, turn-keys, lipped surfaces, and welding.

FIGS. 10–12 show the construction of another embodiment of the fencing system having an adaptor 52 for mounting the wire support member 20B to a fence rail. The adaptor 52 is received on a fence rail and supports the wire support member 20. The adaptor 52 may be used when an owner does not wish to drill holes directly into the PVC fence rails 100 or when it is desirable to offset the electric wire a distance from the fence rails. The adaptor is particularly useful when a spacing between adjacent "T" posts 110 becomes longer than a suggested 8 foot interval. The adaptor 52 clips on to the fence rail 100 so that a wire support member 20 can be installed mid span to ensure that the electric wire does not sag against the fence wire 114. The adaptor 52 includes a bracket 60, which is adapted to be positioned around at least a portion of the fence rail 100, and a connector 58 supported by the bracket. The bracket 60 may be provided with a roughened and/or tacky surface to facilitate gripping the fence rail. The roughened surface enhances the friction between the surfaces and may comprise any suitable means, including but not limited to grooves, ridges, ribs, or the like. The bracket 60 may be adapted to be mounted on rectangular, circular, square fence rails, or fence rails set at an angle. Further, the adaptor 52 allows electric wire mounting on fence rails without drilling holes in the fence rail.

The connector 58 forms a cavity 56 with an opening 54 for receiving the stem 44 of the wire support member 20B in a snap fit connection. In combination, the fence rail holder 10 and the adaptor 52 allow the fencing system to support a wire at the fence posts and along fence rails. The connector 58 extends from the bracket 60 a distance such that a wire held by the wire support member 20 does not contact the fence post, fence rail, or wire fencing.

Figure 13:
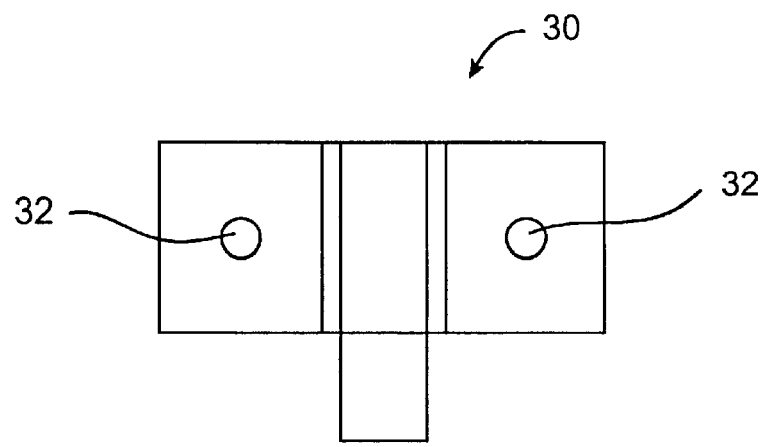
FIGS. 13, 14, and 15 are front, side, and top views of an alternative clip for fastening the fence rail holder to a wood fence post.
Figure 14:
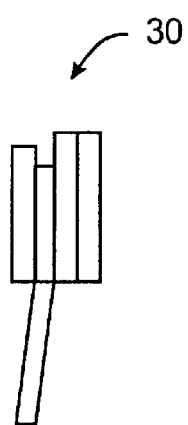
Figure 15:
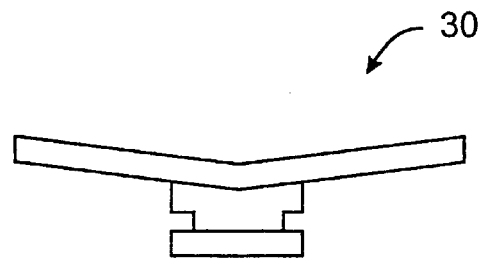
Figure 16:
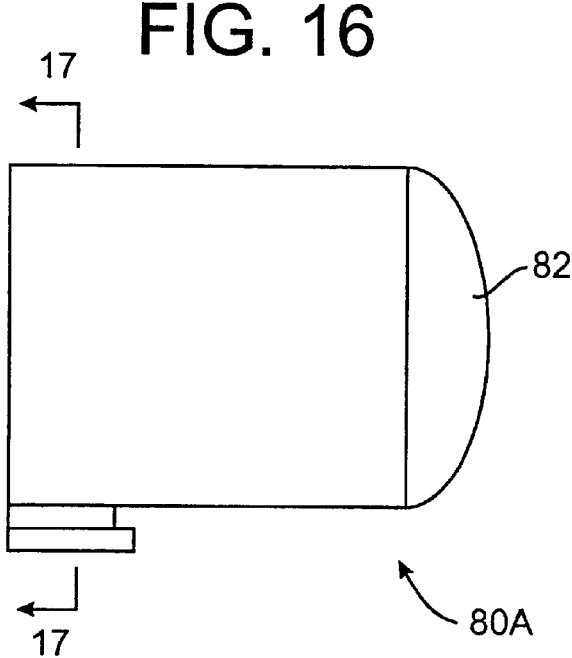
FIG. 16 is a side view of a fence post cap for fastening the fence rail holder to a fence post.
Figure 17:
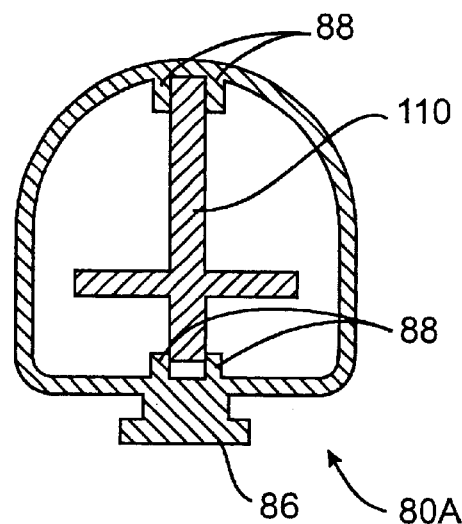
FIG. 17 is a cross-sectional view of the fence post cap of FIG. 16 and a fence post, taken along line 17—17 of FIG. 16.
Figure 18:
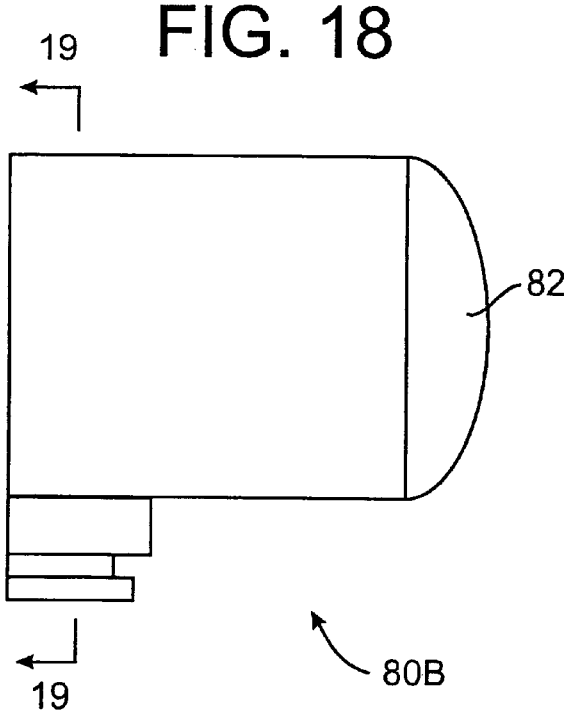
FIG. 18 is a side view of an alternative embodiment of a fence post cap.
Figure 19:
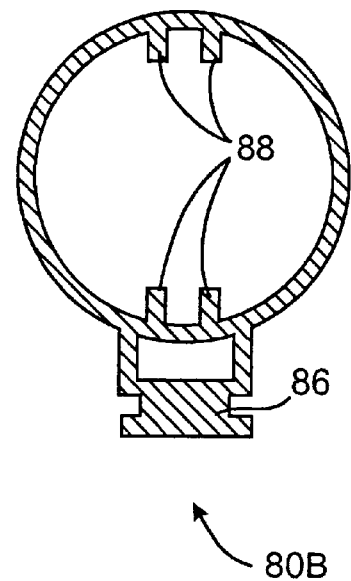
FIG. 19 is a cross-sectional view of the fence post cap of FIG. 18, taken along line 19—19.

The fence rail holder 10 according to the present invention may also be used with other types of fence posts such as round or square wooden posts. FIGS. 13–15 illustrate an alternative embodiment of a clip 30 which is configured to allow the fence rail holder 10 to be attached to round or square fence posts. The clip 30 includes holes 32 which allow the clip to be nailed to a round, square, or other shaped wooden fence post or screwed or riveted to a square, round, or other shaped metal fence post. The clip 30 takes the place of the clips 16, 18 for supporting the fence rail holder 10 on the post.

FIGS. 16–19 illustrate two embodiments of a fence post cap for fastening a fence rail holder 10 to a top of a fence post. The fence post cap 80A of FIGS. 16 and 17 has a D-shaped cross section, a domed top 82, and a mounting portion 86 to be received in a top opening 26 of the fence rail holder 10. An interior of the cap 80A includes two pairs of ribs 88 for contacting the front and back of the T-post 110. The fence post cap 80B of FIGS. 18 and 19 has a circular cross section. Other shaped fence post caps may also be used.

The fence post caps 80A, 80B support the fence rail holder 10 at a top of the fence post. The caps 80A, 80B prevent animals from injuring themselves on the tops of the fence posts. The caps also prevent animals from being able to push the fence rail holder 10 down on the post 110. The fence post caps may be integral with the fence rail holder 10 or separated as shown.

Several fence rail holders 10 may be used on a single post to form a multi-rail fence. The fence system of the present invention may be used with or without a wire mesh fence.

The fencing system according to the present invention provides the advantages of easy installation, low cost, durability, and visibility. In addition, the fencing system helps to shield the dangerous exposed top of the metal post. The fencing system also allows the incorporation of an electric wire or barbed wire onto the front face of the fence rail holders and fence rails.

The wire support members 20 according to the present invention provide a simple low cost manner of attaching an electric wire to PVC sensing systems. Animals tend to lose "respect" for vinyl fencing without electric wire and cause damage to the fence by leaning, scratching, kicking, or reaching through the fence. The wire support members 20 provide a way to attach an electric wire to the PVC fencing system.

While the invention has been described in detail with reference to the preferred embodiments thereof, it will be apparent to one skilled in the art that various changes and modifications can be made and equivalents employed, without departing from the present invention.

What is claimed is:

1. A fencing system for mounting fence rails on a fence post comprising:

a metal fence post having a plurality of protrusions;

a body having openings configured to receive and support ends of fence rails; and at least one clip secured to the body, the clip configured to connect the body to the fence post by clipping onto the post with the post exterior to the body, the at least one clip dimensioned to be received between the protrusions on the fence post.

2. The system of claim 1, wherein the body is formed of PVC.

3. The system of claim 1, wherein the body is a substantially rectangular box shaped body having the openings on opposite side surfaces of the box shaped body.

4. The system of claim 1, wherein the at least one clip is configured to be detachably connected to a T-shaped metal fence post.

5. A fence rail holder for mounting fence rails on a fence post, comprising:

a body having openings for receiving and supporting ends of fence rails; and at least one clip secured to the body, the clip configured to connect the body to a fence post, wherein the at least one clip comprises a first fixed clip and a second movable clip which allows a distance between the first and second clips to be varied to accommodate different fence post configurations.

6. The system of claim 1, wherein the at least one clip is provided with fasteners for connection to a wooden fence post.

7. The system of claim 1, wherein the at least one clip comprises a first clip and a second clip having a cap portion which fits over a top of the fence post.

8. The system of claim 1, further comprising a wire support member of an electrically insulating material on the body, the wire support member configured for connecting an electric wire to the fence rail holder body.

9. The system of claim 1, wherein the openings for receiving the fence rails are about 1½ inches by about 5½ inches.

10. A fencing system comprising:

a metal fence post having a plurality of protrusions for supporting fence wire;

a plastic fence rail holder sized to receive only a single row of fence rails connected to the metal fence post by clips, the fence rail holder having openings on opposite sides of the fence rail holder; and a plurality of fence rails received and secured in the openings, the plurality of rails arranged in a single row.

11. The fencing system of claim 10, wherein the fence rails are plastic.

12. The fencing system of claim 10, wherein the fence rail holder has a substantially rectangular box shaped body having the openings on opposite side surfaces of the box shaped body.

13. The fencing system of claim 10, wherein the metal fence post has a T-shaped cross section.

14. The fencing system of claim 13, wherein the clips are configured to be detachably connected to the T-shaped metal fence post.

15. The fencing system of claim 10, further comprising a locking member for locking the fence rails to the fence rail holder.

16. The fencing system of claim 15, wherein the locking member includes a pin which is inserted through holes in the fence rail after the fence rail has been inserted into the fence rail holder.

17. The fencing system of claim 10, further comprising a wire support member of an electrically insulating material attached to the fence rail holder, the wire support member configured for connecting an electric wire to the fence rail holder.

18. The fence rail holder of claim 4, wherein the at least one clip comprises two clips configured to be detachably connected to a T-shaped fence post.

19. The fencing system of claim 10, wherein the fence rail holder is formed of PVC.

20. The fence rail holder of claim 1, wherein the at least one clip comprises a first fixed clip and a second movable clip.

21. The fencing system of claim 1, wherein the fence rails are substantially rigid.

22. The fencing system of claim 3, wherein the at least one clip is secured to a back surface of the box shaped body.

23. The fencing system of claim 10, wherein the at least one clip comprises a first fixed clip and a second movable clip.

24. The fencing system of claim 10, wherein the fence rails are substantially rigid.

25. The fence rail holder of claim 5, wherein the at least one clip has a cap portion which fits over a top of the fence post.

26. The fence rail holder of claim 5, further comprising a wire support member of an electrically insulating material on the body, the wire support member configured for connection an electric wire to the fence rail holder body.

27. The fence rail holder of claim 5, further comprising a bracket, the bracket is adapted to be positioned around at least a portion of a fence rail, and a connector supported by the bracket for a wire support member.

28. A fence system for mounting fence rails on a fence post having a plurality of protrusions, comprising:

a T-shaped metal fence post;

a body sized to receive only a single row of fence rails, the body having openings configured to receive and support ends of the fence rails arranged in the single row; and at least one clip secured to the body, the clip configured to connect the body to the T-shaped metal fence post and dimensioned to be received between the protrusions on the T-shaped fence post.

29. The fence system of claim 28, wherein the at least one clip has a cap portion which fits over a top of the fence post.

30. The fence system of claim 28, further comprising a wire support member of an electrically insulating material on the body, the wire support member configured for connection an electric wire to the fence rail holder body.

31. The fence system of claim 28, further comprising a bracket, the bracket is adapted to be positioned around at least a portion of a fence rail, and a connector supported by the bracket for a wire support member.

* * * * *